United States Patent [19]

Huang

[11] Patent Number: 5,703,751
[45] Date of Patent: Dec. 30, 1997

[54] ELECTRICAL APPARATUS WITH A DETACHABLE POWER SUPPLY BASE

[76] Inventor: Ming-Chou Huang, No. 16, Lane 43, Hua Cheng Road, Hsin Chuang, Taipei Hsien, Taiwan

[21] Appl. No.: 647,627

[22] Filed: May 15, 1996

[51] Int. Cl.⁶ ............................................. H02B 1/26
[52] U.S. Cl. ........................ 361/625; 307/150; 361/622; 361/807; 361/809; 361/810; 429/100
[58] Field of Search ........................ 307/150; 361/622, 361/624, 625, 608, 725–727, 741, 756, 775, 802, 807, 809, 825; 429/96–100

[56] References Cited

U.S. PATENT DOCUMENTS

| | | | |
|---|---|---|---|
| 2,988,655 | 6/1961 | Rudolph et al. | 361/625 |
| 4,739,452 | 4/1988 | Fukunaga | 361/810 |
| 4,985,806 | 1/1991 | Mazzullo et al. | 361/775 |
| 4,996,628 | 2/1991 | Harvey et al. | 361/756 |
| 5,113,317 | 5/1992 | Howe | 361/807 |

*Primary Examiner*—Gregory N. Thompson
*Attorney, Agent, or Firm*—Jacobson, Price, Holman & Stern, PLLC

[57] ABSTRACT

An electrical apparatus with a detachable power supply base, including a power supply base which holds a rechargeable battery and a control circuit on the inside and has two coupling channel bars at the top, and an electrical apparatus having a base and two outward coupling flanges raised from two opposite sides of the base and adapted for detachably coupling to the coupling channel bars of the power supply base to become electrically connected to the battery of the power supply base. The control circuit detects the power level of the battery and shows it through a display for example an indicator light on the outside of the power supply base.

9 Claims, 4 Drawing Sheets

# ELECTRICAL APPARATUS WITH A DETACHABLE POWER SUPPLY BASE

BACKGROUND OF THE INVENTION

The present invention relates to electrical apparatus, and relates more particularly to such an electrical apparatus which has a detachable power supply base which holds a rechargeable battery that provides the necessary working power supply to the electrical apparatus.

Regular electrical apparatus are commonly designed to be used with city power supply. These electrical apparatus are not suitable for use outdoors because they cannot be operated without city power supply. There are small electrical apparatus designed to be used with battery power supply. However, these electrical apparatus must be used with particular battery.

SUMMARY OF THE INVENTION

According to one aspect of the present invention to provide an electrical apparatus with a detachable power supply base which is comprised of an electrical apparatus, and a power supply base, wherein the power supply base comprises a power supply device on the inside, and an electrical receptacle disposed on the outside and connected to the power supply device by conductors and adapted for coupling to the base of the electrical apparatus to provide it with the necessary working power supply. According to another aspect of the present invention, the power supply device of the power supply base is a rechargeable battery which can be charged with electricity for a repeated use when its power level is low. According to still another aspect of the present invention, the power supply base comprises a control circuit and an indicator light, wherein the control circuit detects the power level of the power supply device and shows its detection through the indicator light. According to still another aspect of the present invention, the power supply base further comprises a charging hole adapted to receive the cigarette lighter of a car to charge the power supply device.

DETAILED DESCRIPTION OF THE PREFERRED EMBODIMENTS

Figure 1:
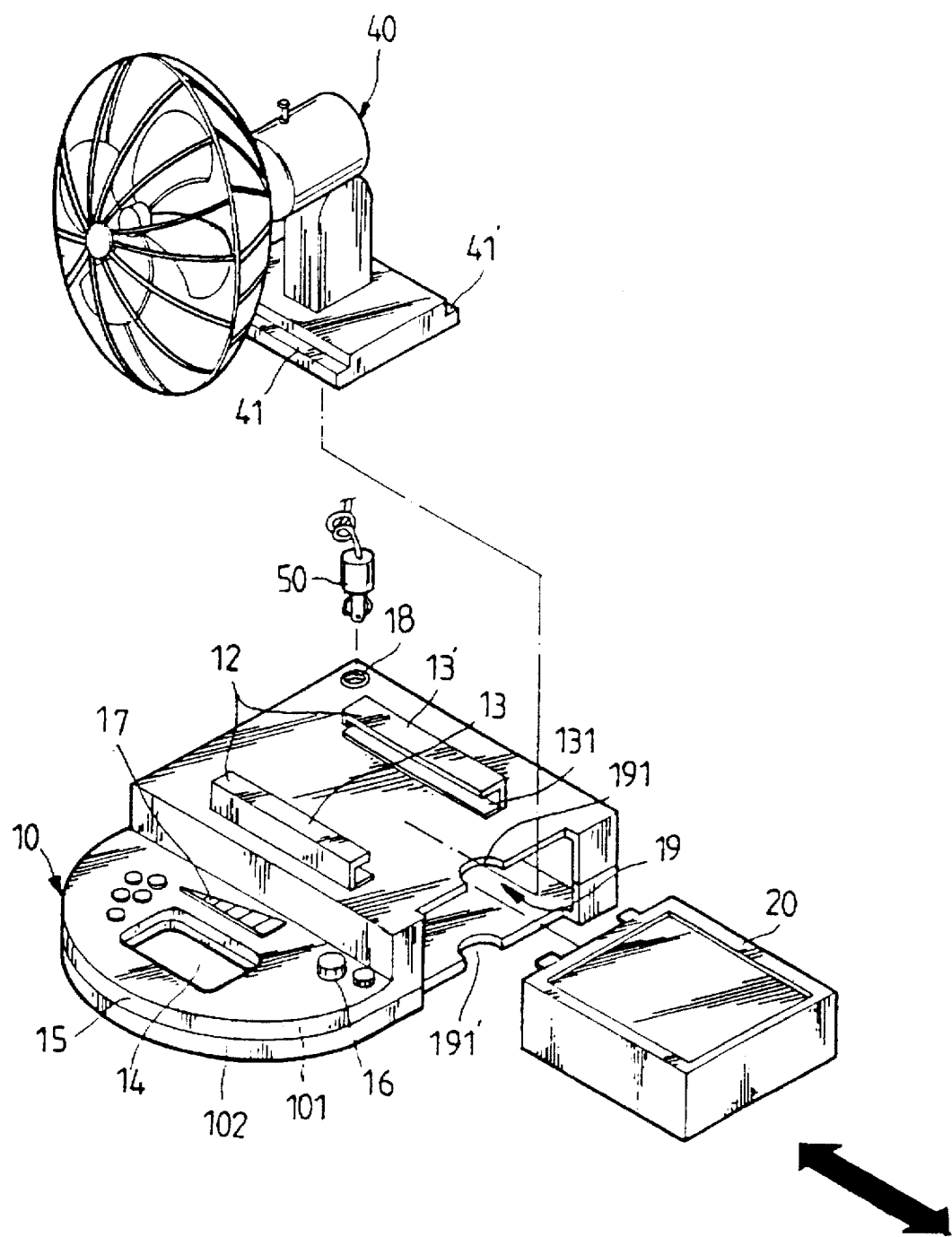
FIG. 1 is an exploded view of an electrical apparatus with a detachable power supply base according to the present invention.

Referring to FIG. 1, an electrical apparatus with a detachable power supply base in accordance with the present invention is generally comprised of an electrical apparatus 40, and a power supply base which is comprised of a casing 10, a control circuit (not shown), and a battery 20. The casing 10 is comprised of an upper shell 101 and a bottom shell 102 connected together, defining a storage chamber 11 (not shown) adapted for holding the control circuit and the battery 20. As illustrated, the casing 10 comprises a receptacle 12 which is comprised of two coupling channel bars 13, 13' raised from the top side and facing each other and a pair of electrical conductive plates for example metal contact plates 131 respectively mounted inside the coupling channel bars 13, 13' and connected to the positive and negative terminals of the battery 20 by conductors (not shown), an opening 14 disposed at a suitable location and defining with the casing 10 a carrying handle 15, an ON/OFF switch 16 and an indicator means 17 respectively disposed at the top side out of the space defined between the coupling channel bars 13, 13, an electrical charging hole 18 at a suitable location adapted for receiving external DC power supply to charge the battery 20, a battery loading slot 19 at one lateral side in communication with the storage chamber 11 through which the battery 20 can be moved in and out of the storage chamber 11, and two finger notches 191, 191' vertically disposed at two opposite sides of the battery loading slot 19 in the middle into which fingers can be inserted to pull the battery 20 out of the casing 10.

Figure 2:
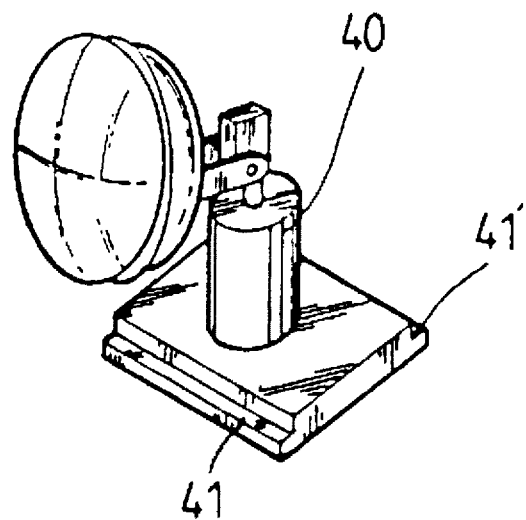
FIG. 2 is an elevational view of an electrical apparatus according to the present invention.
Figure 4:
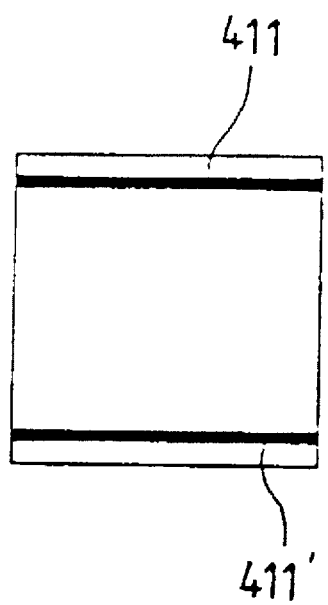
FIG. 4 is a bottom view of the base of the electrical apparatus according to the present invention.

Referring to FIGS. 2 and 4, and FIG. 1 again, the electrical apparatus for example the electrical fan 40 has two outward coupling flanges 41, 41' raised from two opposite sides of the base thereof, and a pair of electrical conductive plates for example metal contact plates 411, 411' respectively fastened to the outward coupling flanges 41, 41' at the bottom (see FIG. 4). When in use, the electrical apparatus 40 is fastened to the casing 10 by fitting the outward coupling flange 41, 41' of the electrical apparatus 40 into the coupling channel bars 13, 13' of the casing 10. When the electrical apparatus 40 is installed in the casing 10, the electrical conductive plates 411, 411' of the electrical apparatus 40 are respectively disposed in contact with the electrical conductive plates 131 of the casing 10, therefore electricity is connected from the battery 20 to the electrical apparatus when the ON/OFF switch 16 is switched on. The control circuit detects the power level of the battery 20, and shows its detection through the indicator means 17. The indicator means 17 can be a liquid crystal display, indicator light(s), or light emitting diode(s). When the power of the battery 20 becomes low, the cigarette lighter 50 of a car can be connected to the electrical charging hole 18 to charge the battery 20 to the saturated status. Furthermore, through the carrying handle 15, the apparatus can be carried by the hand conveniently.

Figure 3:
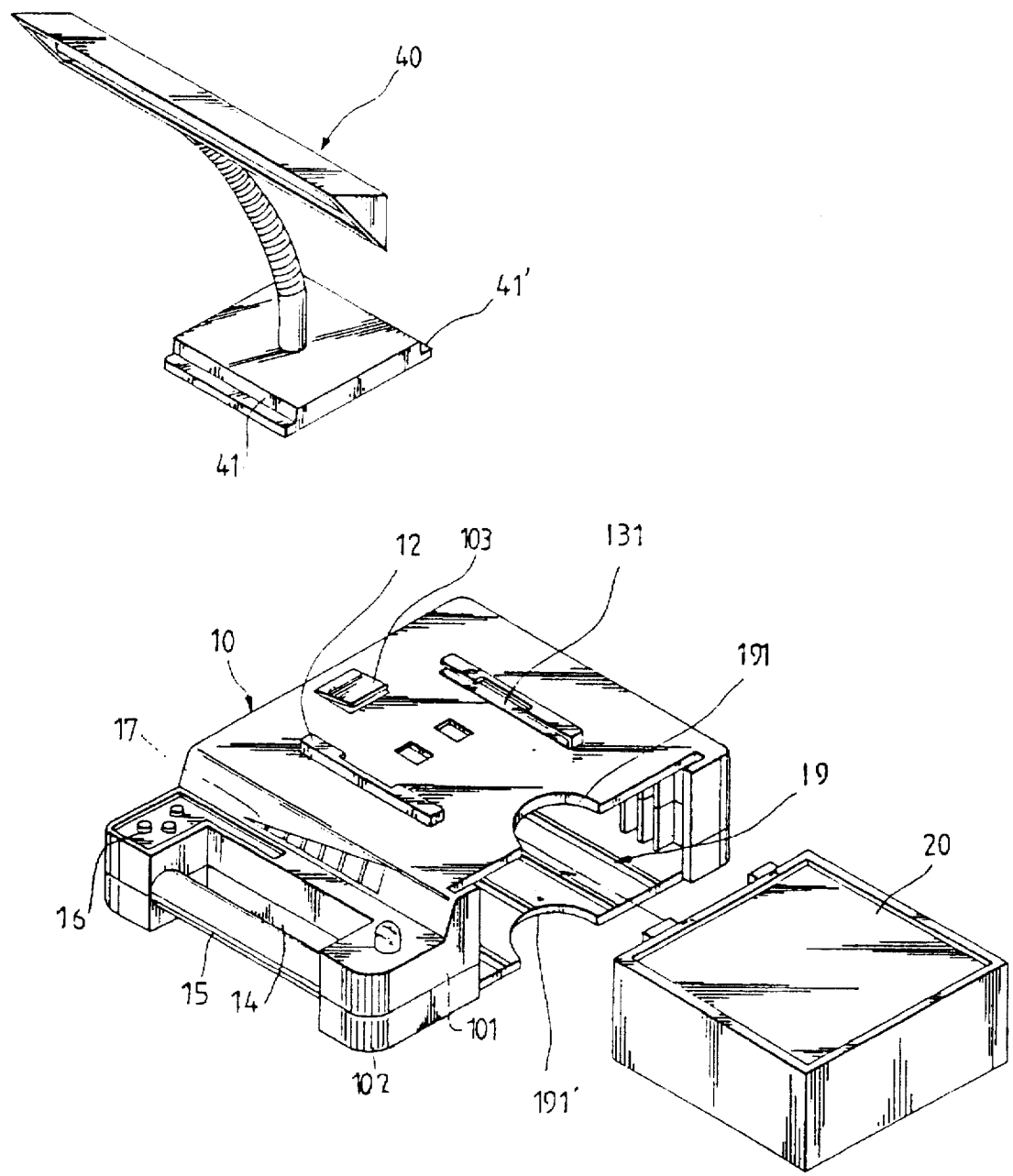
FIG. 3 is an exploded view of an alternate form of the present invention.

FIG. 3 shows an alternate form of the present invention, in which the electrical apparatus 40 shown is a desk lamp; the casing 10 has a spring rod 103 raised from the top side thereof in front of the receptacle 12 (the coupling channel bars). When the electrical apparatus 40 is moved over the spring rod 103, the spring rod 103 is forced downwards for permitting the outward coupling flanges 41, 41' to be moved into engagement with the receptacle 12. When the outward coupling flanges 41, 41' are forced into engagement with the receptacle 12, the pressure of the electrical apparatus 40 is released from the spring rod 103, and the spring rod 103 immediately returns to its former shape to stop the electrical apparatus 40 in the engaged position in engagement with the casing 10.

It is to be understood that the drawings are designed for purposes of illustration only, and are not intended as a definition of the limits and scope of the invention disclosed.

What the invention claimed is:

1. An electrical apparatus with a detachable power supply base, comprising:

a power supply base, said power supply base comprising a casing defining at least one storage chamber, two coupling channel bars respectively raised from said casing and facing each other, and two electrical conductive plates respectively installed in said coupling channel bars;

an electrical apparatus having two outward flanges raised from two opposite sides of a base thereof and adapted for detachably coupling to said coupling channel bars to secure said electrical apparatus to said power supply base, and two electrical conductive plates respectively installed in said outward flanges, the electrical conductive plates of said outward flanges being disposed in contact with the electrical conductive plates of said coupling channel bars when said outward flanges are forced into engagement with said coupling channel bars; and at least one power supply device respectively mounted in the at least one storage chamber of said power supply base, each of said at least one power supply device having two opposite terminals respectively disposed in contact with the electrical conductive plates of said coupling channel bars when installed in the at least one storage chamber of said power supply base.

2. The electrical apparatus with a detachable power supply base of claim 1 wherein said casing further comprises a spring rod disposed in front of said coupling channel bars, said spring rod being forced downwards by the base of said electrical apparatus when the base of said electrical apparatus is moved to force said outward flanges into engagement with said coupling channel bars, and returned to its former shape to stop the base of said electrical apparatus in between said coupling channel bars when said outward flanges are forced into engagement with said coupling channel bars.

3. The electrical apparatus with a detachable power supply base of claim 1 wherein each of said at least one power supply device is a battery.

4. The electrical apparatus with a detachable power supply base of claim 3 wherein said battery is rechargeable.

5. The electrical apparatus with a detachable power supply base of claim 1 wherein said casing has connector means for the connection of an external DC power supply device.

6. The electrical apparatus with a detachable power supply base of claim 1 wherein said power supply base further comprises a display means to show the power level of said at least one power supply device.

7. The electrical apparatus with a detachable power supply base of claim 6 wherein said display means is light emitting diodes.

8. The electrical apparatus with a detachable power supply base of claim 6 wherein said display means is a liquid crystal display.

9. The electrical apparatus with a detachable power supply base of claim 1 wherein the electrical conductive plates of said electrical apparatus and said power supply base are metal contact plates.

* * * * *